United States Patent
Laas et al.

(10) Patent No.: US 7,329,717 B2
(45) Date of Patent: Feb. 12, 2008

(54) POLYISOCYANATE-MODIFIED POLYCARBOXYLIC ACIDS

(75) Inventors: Hans-Josef Laas, Bergisch Gladbach (DE); Christoph Gürtler, Köln (DE); Reinhard Halpaap, Odenthal (DE); Michael Grahl, Leverkusen (DE); Peter Thometzek, Stuttgart (DE); James Rawlins, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 328 days.

(21) Appl. No.: 10/873,081

(22) Filed: Jun. 21, 2004

(65) Prior Publication Data

US 2005/0004320 A1    Jan. 6, 2005

(30) Foreign Application Priority Data

Jun. 26, 2003 (DE) ................ 103 28 663

(51) Int. Cl.
*C08G 18/70*    (2006.01)

(52) U.S. Cl. .................... 528/67; 528/59; 528/84; 528/48

(58) Field of Classification Search ................ 528/48, 528/59, 67, 84
See application file for complete search history.

(56) References Cited

U.S. PATENT DOCUMENTS

| | | | |
|---|---|---|---|
| 3,383,400 A | 5/1968 | Meisert et al. | 260/453 |
| 3,781,379 A | 12/1973 | Theodore et al. | 260/836 |
| 3,922,295 A * | 11/1975 | Tilley | 560/336 |
| 3,996,223 A | 12/1976 | Gupta et al. | 260/248 NS |
| 4,091,048 A | 5/1978 | Labana et al. | 260/836 |
| 4,181,642 A | 1/1980 | Holle et al. | 260/37 EP |
| 4,255,569 A | 3/1981 | Müller et al. | 544/193 |
| 4,837,359 A | 6/1989 | Woynar et al. | 560/335 |
| 4,960,848 A | 10/1990 | Scholl et al. | 528/48 |
| 4,994,541 A | 2/1991 | Dell et al. | 528/51 |
| 5,055,524 A | 10/1991 | Pettit, Jr. et al. | 525/172 |
| 5,064,960 A | 11/1991 | Pedain et al. | 544/222 |
| 5,076,958 A | 12/1991 | Pedain et al. | 252/182.2 |
| 5,371,167 A | 12/1994 | Rehfuss et al. | 528/73 |
| 5,534,601 A * | 7/1996 | Reuter et al. | 525/424 |
| 5,914,383 A | 6/1999 | Richter et al. | 528/59 |
| 5,959,060 A * | 9/1999 | Schafer et al. | 528/84 |
| 2002/0123596 A1 | 9/2002 | Gurtler et al. | 528/44 |

FOREIGN PATENT DOCUMENTS

| | | |
|---|---|---|
| CA | 2064292 | 10/1992 |
| CA | 1335990 | 6/1995 |
| CA | 2154107 | 1/1996 |
| EP | 1 063 251 B1 | 10/2003 |
| GB | 1145952 | 3/1969 |
| GB | 1 244 416 | 9/1971 |
| GB | 1 338 204 | 11/1973 |
| GB | 1 458 564 | 12/1976 |

OTHER PUBLICATIONS

J. Prakt. Chem., 336, (month unavailable) 1994, pp. 185-200, Hans Josef Laas et al, pp. 185-200, "Zur Synthese aliphatischer Polyisocyanate-Lackpolyisocyanate mit Biuret-, Isocyanurat- oder Uretdionstruktur".

* cited by examiner

*Primary Examiner*—Ling-Sui Choi
(74) *Attorney, Agent, or Firm*—Noland J. Cheung

(57) ABSTRACT

A process for preparing polyisocyanate-modified polycarboxylic acids by conversion of anhydride-group-free polycarboxylic acids with isocyanate-functional compounds. The process includes reacting A) an anhydride-group-free polycarboxylic-acid component with B) an isocyanate-functional component having an (average) isocyanate functionality of at least 1.8, at an equivalent ratio of carboxylic acid groups to isocyanate groups of from 1.2:1 to 120:1. The polyisocyanate-modified polycarboxylic acids are solid below 40° C. and liquid above 130° C., and have an average carboxylic acid functionality of at least 1.8, a content of free carboxylic acid groups of from 4.0 wt. % to 80.0 wt. % and a content of amide groups of from 0.4 wt. % to 32.5 wt. %.

8 Claims, No Drawings

POLYISOCYANATE-MODIFIED POLYCARBOXYLIC ACIDS

CROSS REFERENCE TO RELATED PATENT APPLICATION

The present patent application claims the right of priority under 35 U.S.C. §119 (a)-(d) of German Patent Application No. 103 28 663.2, filed Jun. 26, 2003.

FIELD OF THE INVENTION

The invention relates to a process for preparing polyisocyanate-modified polycarboxylic acids by conversion of anhydride-group-free polycarboxylic acids with isocyanate-functional compounds and also to the use of the products as crosslinker components for lacquer binding agents or components of lacquer binding agents having groups that are capable of reacting with carboxyl groups, in particular as crosslinkers for powder-lacquer binding agents based on epoxy resin.

BACKGROUND OF THE INVENTION

Powder lacquers based on epoxy-functional binding agents, such as, for example, glycidyl methacrylates (GMA), are known and are the subject of a large number of publications (see, for example, EP-B 0 509 393, page 2, lines 6 to 17).

Polycarboxylic acids, including in particular the aliphatic dicarboxylic acids, the anhydrides and polyanhydrides thereof, or even carboxy-functional polyesters or polyacrylates, are described as examples of suitable crosslinkers for powder-lacquer binding agents of such a type. Of the large number of possible crosslinker components that have been proposed, dodecanedioic acid or the polyanhydride thereof finds application almost exclusively in practice nowadays. Powder coatings cured with dodecanedioic acid are distinguished at comparatively moderate stoving temperatures by very good optical properties, in particular by outstanding flow, for which reason they have also been employed in the meantime as clear lacquer in the initial lacquering of automobiles.

However, with the exception of their good optics, the properties of powder lacquers based on epoxy-functional binding agents and dicarboxylic acids or dicarboxylic anhydrides as crosslinkers frequently do not satisfy the practical demands that are made of high-quality coatings. In particular, high resistances to chemical or mechanical loading, such as are known, for example, from conventional polyurethane lacquers cured with polyisocyanates, cannot be obtained with such powder-lacquer systems. This is due, on the one hand, to the strict difunctionality of the crosslinker components employed and the low crosslinking density associated therewith, and, on the other hand, to the fact that crosslinking of the system occurs exclusively via ester bonds which, in contrast to urethane bonds, for example, have distinctly higher sensitivity to hydrolysis or to the influence of chemicals.

Attempts have therefore also already been made to improve the properties of carboxy-functional and anhydride-functional crosslinkers by modification with polyisocyanates.

For instance, EP-A 0 695 771 describes conversion products of polyisocyanates with dicarboxylic (poly)anhydrides, which may optionally be present in a mixture with up to 50 wt. % of pure dicarboxylic acids, as crosslinker components for powder-lacquer binding agents based on epoxy resin. For the purpose of adjusting the molecular weight, low-molecular amines, alcohols or amino alcohols are optionally added in the course of synthesis of these crosslinkers. A very similar process for preparing polyisocyanate-modified polycarboxylic acids from dicarboxylic polyanhydrides is the subject of EP-A 0 874 010, wherein, however, water is added to the reaction mixture instead of amino-functional and/or hydroxy-functional molecular-weight regulators, in order to adjust the molecular weight of at least some of the anhydride structures selectively by hydrolysis. With both processes it is possible for branched crosslinkers to be obtained which, in combination with customary epoxy-functional powder-lacquer binding agents, yield higher-quality coatings. However, the synthesis of the polyanhydrides required as intermediate stage by conversion of dicarboxylic acids with acetic anhydride, subject to simultaneous removal of acetic acid by distillation, makes the preparation of these polyisocyanate-modified dicarboxylic (poly)anhydrides on a technical scale extraordinarily elaborate and expensive. In particular, by reason of their high cost the modified polycarboxylic acids according to EP-A 0 695 771 and EP-A 0 874 010 have been unable to gain market acceptance until now, despite their good crosslinker properties.

U.S. Pat. No. 5,371,167 also describes carboxy-functional polyisocyanate derivatives, prepared from polyisocyanates and compounds having at least one carboxyl group and at least one group, different from carboxyl, that is reactive with isocyanates, preferably hydroxycarboxylic acids or aminocarboxylic acids, which are employed in solvent-containing lacquer systems as crosslinkers for polyols, polyepoxides, polycarbodiimides or melamine-formaldehyde resins. Preparation of these carboxy-functional polyurethanes or polyureas is possible exclusively in solution under very mild conditions. For use as powder-lacquer crosslinkers, the products would therefore have to be freed from the solvent in an additional process step, which again is expensive. Preparation in a melt is not possible, by reason of the comparatively small differences in reaction between carboxyl groups and hydroxyl or amino groups in comparison with isocyanates.

The object of the present invention was therefore to make available a novel process for preparing polyisocyanate-modified carboxy-functional compounds, with which, starting from readily available raw materials, working can proceed easily, i.e. without elaborate process steps such as distillation for example, in a melt for example. The products obtained by this process have to enable, as powder-lacquer crosslinkers in combination with commercial powder-lacquer binding agents based on epoxy resin, in particular with glycidyl-functional polyacrylates, the preparation of high-quality powder coatings.

SUMMARY OF THE INVENTION

The present invention is directed to a process for preparing polyisocyanate-modified polycarboxylic acids including reacting A) an anhydride-group-free polycarboxylic-acid component with B) an isocyanate-functional component having an (average) isocyanate functionality of at least 1.8 at an equivalent ratio of carboxylic acid groups to isocyanate groups of from 1.2:1 to 120:1, where the polyisocyanate-modified polycarboxylic acids are solid below 40° C. and liquid above 130° C., and have a) an average carboxylic acid functionality of at least 1.8,
b) a content of free carboxylic acid groups (determined as —COOH; molecular weight=45) of from 4.0 wt. % to 80.0 wt. % and
c) a content of amide groups (determined as —CONH—; molecular weight=43) of from 0.4 wt. % to 32.5 wt. %.

The present invention is also directed to polyisocyanate-modified polycarboxylic acids prepared according to the above-described process.

The present invention is additionally directed to a composition that includes the polyisocyanate-modified polycarboxylic acids according to the invention and one or more lacquer binding agents, a non-limiting example being powder-lacquer binding agents containing glycidyl groups, and optionally one or more auxiliary substances and additives selected from the group consisting of pigments, fillers, flow-control agents, light stabilizers, UV-absorbers, colour stabilizers, and combinations thereof.

The present invention also provides a method of coating a substrate that includes applying the composition described above to a substrate including metals, plastics, wood and/or glass as well as substrates coated according to the method.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

It has been possible for the object of the invention to be achieved through the provision of the process described below. It has been found that, by conversion of anhydride-group-free polycarboxylic acids with isocyanate-functional compounds, solid products are obtained that are suitable as powder-lacquer crosslinkers, that are distinguished by low melt viscosities, and that result in coatings with high gloss and good mechanical and chemical resistances.

The present invention therefore provides the preparation of polyisocyanate-modified polycarboxylic acids that are solid below 40° C. and liquid above 130° C., having
a) an average carboxyl functionality of at least 1.8,
b) a content of free carboxyl groups (reckoned as —COOH; molecular weight=45) from 4.0 wt. % to 80.0 wt. % and
c) a content of amide groups (reckoned as —CONH—; molecular weight=43) from 0.4 wt. % to 32.5 wt. %, by conversion of
A) an anhydride-group-free polycarboxylic-acid component with
B) an isocyanate-functional component having an (average) isocyanate functionality of at least 1.8 while adhering to an equivalent ratio of carboxyl groups to isocyanate groups from 1.2:1 to 120:1.

The invention also provides the use of the polyisocyanate-modified polycarboxylic acids obtained in this way as crosslinker components for lacquer binding agents having groups that are reactive with carboxyl groups, in particular for powder-lacquer binding agents comprising glycidyl groups.

Initial components A) for preparing the polyisocyanate-modified polycarboxylic acids according to the invention are any anhydride-group-free carboxylic acids of aliphatic, cycloaliphatic, aromatic and/or heteroaromatic nature which may optionally be substituted, for example by halogen atoms, and/or unsaturated. The term "anhydride-group-free" here does not exclude the case where the carboxylic acids employed may also contain anhydride groups in small quantities (as an undesirable contaminant). In the sense of the present invention, "anhydride-group-free" signifies merely that the proportion of carboxyl groups that are present in the form of anhydride groups amounts to less then 5 mol. %, preferably less than 2 mol. %, particularly preferably less than 1 mol. %. Suitable initial components A) are, for example, difunctional and trifunctional carboxylic acids within the molecular-weight range from 104 to 370, such as, for example, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, eicosanedioic acid, the isomeric cyclohexanedicarboxylic acids, maleic acid, phthalic acid, isophthalic acid, terephthalic acid, tetrahydrophthalic acid, trimellitic acid, the isomeric pyridinedicarboxylic acids or arbitrary mixtures of such carboxylic acids. In addition to these dicarboxylic and tricarboxylic acids, monocarboxylic acids may also optionally be present in subordinate amounts in the initial component A). Suitable monocarboxylic acids are, for example, those within the molecular-weight range from 118 to 132, such as, for example, capronic acid, caprylic acid, pelargonic acid, lauric acid, myristic acid, palmitic acid, stearic acid, eicosanoic acid, oleic acid, benzoic acid or mixtures thereof. The proportion of these monocarboxylic acids in the initial component A) amounts generally to a maximum of 10 wt. %.

Particularly suitable initial components A) are the saturated aliphatic and/or cycloaliphatic dicarboxylic acids with 4 to 20 carbon atoms, or mixtures thereof. Quite particularly preferred are the stated saturated linear aliphatic dicarboxylic acids with 5 to 12 carbon atoms, or mixtures thereof.

By way of initial components B) in the preparation of the polyisocyanate-modified polycarboxylic acids according to the invention, arbitrary isocyanate-functional compounds are used that have an (average) functionality of at least 1.8.

Suitable are, for example, monomeric diisocyanates and triisocyanates with aliphatically, cycloaliphatically and/or aromatically bound isocyanate groups, which may be prepared by arbitrary processes, for example by phosgenation or by phosgene-free methods, for example by dissociation of urethane, in particular those within the molecular-weight range from 140 to 400, such as, for example, 1,4-butane diisocyanate, 1,6-diisocyanatohexane (hexamethylene diisocyanate, HDI), 1,5-diisocyanato-2,2-dimethylpentane, 1,10-diisocyanatodecane, 2,2,4- or 2,4,4-trimethyl-1,6-diisocyanatohexane, 1,3- and 1,4-diisocyanatocyclohexane, 1,3- and 1,4-bis(isocyanatomethylcyclohexane), 1-isocyanato-3,3,5-trimethyl-5-isocyanatomethylcyclohexane (IPDI, isophorone diisocyanate), 1-isocyanato-1-methyl-4(3)-isocyanatomethylcyclohexane, 2,4'- and 4,4'-diisocyanatodicyclohexyl-methane, 1,3-diisocyanato-2(4)-methylcyclohexane, 4-isocyanatomethyl-1,8-octanediisocyanate (triisocyanatononane, TIN), 1,3- and 1,4-phenylene diisocyanate, 1,3- and 1,4-bis(isocyanatomethylbenzene), tetramethylxylylene diisocyanate (TMXDI), 2,4- and 2,6-toluylene diisocyanate (TDI), diphenylmethane-2,4'-diisocyanate, diphenylmethane-4,4'-diisocyanate and naphthylene-1,5-diisocyanate or mixtures thereof.

Suitable initial components B) are also polyisocyanates prepared by modification of these diisocyanates or triisocyanates, having uretdione, isocyanurate, iminooxadiazinetrione, urethane, allophanate, biuret and/or oxadiazinetrione structure, such as are described in exemplifying manner in, for example, J. Prakt. Chem. 336 (1994) 185-200 or in DE-A 16 70 666, DE-A 1 954 093, DE-A 2 414 413, DE-A 2 452 532, DE-A 2 641 380, DE-A 3 700 209, DE-A 3 900 053, DE-A 3 928 503, EP-A 0 336 205, EP-A 0 339 396 and EP-A 0 798 299.

Also suitable as initial components B) are NCO-functional prepolymers with an average NCO functionality from 2.0 to 4.0 and with an average molecular weight, calculable from functionality and NCO content, from 350 to 5000, preferably from 400 to 2000, quite particularly preferably 450 to 1200, such as can be obtained in known manner by conversion of the aforementioned diisocyanates, triisocyanates and/or polyisocyanates with substoichiometric quantities of polyols, in particular those within the molecular-weight range from 62 to 2000. Polyols that are suitable for prepolymerisation are described explicitly in, for example, EP-A 1 063 251, from page 4, column 5, line 50 to page 5, column 7, line 37. Particularly preferred prepolymers as initial components B) are those based on the polyester polyols described in EP-A 1 063 251.

The monomeric diisocyanates, triisocyanates, polyisocyanates and NCO prepolymers named above as suitable initial components B) for preparing the polyisocyanate-modified polycarboxylic acids according to the invention may, of course, also be employed in the form of arbitrary mixtures with one another. With a view to adjusting particular properties, for example the functionality or the melt viscosity, concomitant use may optionally be made of monoisocyanates as a constituent of the isocyanate-functional component B). Suitable monoisocyanates are, for example, butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- and 4-methylcyclohexyl isocyanate or arbitrary mixtures of such monoisocyanates.

In the case of concomitant use of monoisocyanates, however, the latter are used maximally in such quantities that the (average) isocyanate functionality of the initial component B) amounts to at least 1.8. The isocyanate-functional component B) preferably has an (average) isocyanate functionality from 2.0 to 6.0, particularly preferably from 2.0 to 4.5.

Preferred initial components B) are those of the type described above with exclusively aliphatically and/or cycloaliphatically bound NCO groups. Quite particularly preferred are HDI, IPDI and 4,4'-diisocyanatodicyclohexylmethane, as well as polyisocyanates and NCO prepolymers based on these diisocyanates.

With a view to preparing the polyisocyanate-modified polycarboxylic acids according to the invention, the initial components A) and B) are caused to react with one another generally at temperatures above their melting-range, preferably within the temperature-range from 90° C. to 180° C., particularly preferably from 100° C. to 150° C., while adhering to an equivalent ratio of carboxyl groups to NCO groups of from 1.2:1 to 120:1, preferably from 2:1 to 50:1, particularly preferably 4:1 to 25:1, preferably until the end of the evolution of $CO_2$, which generally begins spontaneously.

In this case, further auxiliary substances and additives may optionally be added to the initial compounds.

With a view to accelerating the conversion, the customary catalysts known from polyurethane chemistry may, for example, be used concomitantly; for example, tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane, N,N'-dimethylpiperazine or metal salts such as iron(II) chloride, aluminium tri(ethylacetoacetate), zinc chloride, zinc(II)-n-octoate, zinc(II)-2-ethyl-1-hexanoate, zinc(II)-2-ethylcaproate, zinc(II) stearate, zinc (II) naphthenate, zinc(II) acetylacetonate, tin(II)-n-octoate, tin(II)-2-ethyl-1-hexanoate, tin(II) ethylcaproate, tin(II) laurate, tin(II) palmitate, dibutyltin(IV) oxide, dibutyltin(IV) dichloride, dibutyltin(IV) diacetate, dibutyltin(IV) dimaleate, dibutyltin(IV) dilaurate, dioctyltin(IV) diacetate or molybdenum glycolate. Catalysts that are preferably employed are the metal salts that accelerate the reaction of carboxyl groups with isocyanates and that are known from EP-A 1 238 993, in particular salts of elements pertaining to the $2^{nd}$ and $3^{rd}$ main groups of the Periodic Table, such as, for example, calcium or magnesium stearate, calcium or magnesium perchlorate, magnesium trifluoromethanesulfonate, aluminium triethylate, as well as lanthanoid salts, such as, for example, lanthanum(III) acetate or ytterbium (III) trifluoromethylsulfonate. Arbitrary mixtures of the compounds named above in exemplifying manner are, of course, also suitable catalysts.

These catalysts are used in the preparation of the polyisocyanate-modified polycarboxylic acids according to the invention optionally in a quantity from 0.001 wt. % to 2 wt. %, preferably 0.005 wt. % to 0.5 wt. %, relative to the total weight of the initial compounds A) and B).

Further auxiliary substances and additives that may be added to the initial compounds in the course of the process according to the invention are, for example, the flow-control agents known from powder-lacquer technology, such as, for example, polybutyl acrylate or those based on polysilicones, light stabilizers, such as, for example, sterically hindered amines, UV-absorbers, such as, for example, benzotriazoles or benzophenones, as well as colour stabilizers for countering the risk of yellowing due to overstoving, such as, for example, trialkyl, triaryl and/or trisalkylphenyl phosphites which optionally have inert substituents.

The process according to the invention is generally carried out in solvent-free manner in a melt. But conversion may, of course, optionally also be effected in a suitable solvent that is inert with respect to isocyanate groups. Suitable solvents for this less preferred way of proceeding are, for example, the customary lacquer solvents, known as such, such as, for example, ethyl acetate, butyl acetate, ethylene glycol monomethyl ether acetate, ethylene glycol monoethyl ether acetate, 1-methoxypropyl-2-acetate, 2-butanone, 4-methyl-2-pentanone, cyclohexanone, toluene, or mixtures thereof, but also solvents such as acetone, propylene glycol diacetate, diethylene glycol dimethyl ether, diethylene glycol ethyl ether acetate, diethylene glycol butyl ether acetate, N-methylpyrrolidone, N-methylcaprolactam, N,N-dimethylformamide, N,N-dimethylacetamide and methylene chloride or mixtures of such solvents.

After conversion has taken place, these solvents which are optionally used concomitantly are separated from the process product according to the invention with the aid of suitable methods, for example by precipitation and simple removal by suction, spray drying or melt extrusion in an evaporation screw.

Irrespective of the manner of implementation, with the process according to the invention polyisocyanate-modified polycarboxylic acids are obtained in simple manner depending upon the chosen equivalent ratio of carboxyl groups to isocyanate groups, having an average carboxy functionality of at least 1.8, preferably from 2.0 to 6.0, particularly preferably 2.0 to 5.0, a content of free carboxyl groups (reckoned as —COOH; molecular weight=45) from 4.0 wt. % to 80.0 wt. %, preferably from 6.0 wt. % to 70.0 wt. %, particularly preferably from 8.0 wt. % to 60.0 wt. %, and a content of amide groups (reckoned as —CONH—; molecular weight=43) from 0.4 wt. % to 32.5 wt. %, preferably from 0.6 wt. % to 24.0%, particularly preferably from 1.2 wt. % to 15.5 wt. %, which are solid below 40° C. and liquid above 150° C., and which have, in particular, a melting-point or melting-range, determined by Differential Thermal Analysis (DTA), that lies within a temperature-range from 40° C. to 130° C., particularly preferably within the temperature-range from 50° C. to 125° C.

The polyisocyanate-modified polycarboxylic acids according to the invention are outstandingly suitable as crosslinker components for lacquer binding agents, in particular for powder-lacquer binding agents having groups that are reactive with carboxyl groups.

In this connection it is a question, for example, of the known epoxy-functional powder-lacquer binding agents, preferably of polyacrylate resins containing epoxide groups, which may be prepared in accordance with methods known from the literature by copolymerisation of at least one ethylenically unsaturated monomer that contains at least one epoxide group in the molecule, with at least one other ethylenically unsaturated monomer that contains no epoxide group in the molecule. Suitable polyacrylate resins containing epoxide groups are described, for example, in EP-A 0 299 420, DE-A 2 214 650, DE-A 2 749 576, U.S. Pat. No. 4,091,048 and U.S. Pat. No. 3,781,379.

The epoxy-functional monomers that are employed for preparing the epoxy-functional powder-lacquer binding agents are, in particular, glycidyl acrylate, glycidyl methacrylate and allyl glycidyl ether. By way of examples of ethylenically unsaturated monomers that contain no epoxide group in the molecule, the following may be named in exemplifying manner: alkyl esters of acrylic and methacrylic acid with up to 18, preferably up to 8, carbon atoms in the alkyl residue, such as, for example, methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, tert-butyl acrylate, tert-butyl methacrylate, 2-ethylhexyl acrylate, 2-ethylhexyl methacrylate, neopentyl acrylate, neopentyl methacrylate, stearyl methacrylate, the cyclohexyl, isobornyl, 3,3,5-trimethylcyclohexyl, phenyl, benzyl or 2-phenyl esters of acrylic acid and methacrylic acid, but also dialkyl esters or cycloalkyl esters of maleic or fumaric acid with up to 8 carbon atoms in the alkyl residues, such as, for example, dimethyl maleate, diethyl maleate, diisopropyl maleate, diisobutyl maleate, di-tert-butyl maleate, dicyclohexyl maleate and the corresponding dialkyl esters of fumaric acid.

Further examples of ethylenically unsaturated monomers that contain no epoxide groups in the molecule are acid amides, such as, for example, acrylic and methacrylic acid amide, vinyl aromatic compounds, such as, for example, styrene, methylstyrene and vinyltoluene, nitriles, such as, for example, acrylonitrile and methacrylonitrile, vinyl and vinylidene halides, such as, for example, vinyl chloride and vinylidene fluoride, vinyl esters, such as, for example, vinyl acetate, as well as hydroxyalkyl esters of acrylic or methacrylic acid with 2 to 8, preferably 2 to 4, carbon atoms in the hydroxyalkyl residue, such as, for example, hydroxyethyl acrylate, hydroxyethyl methacrylate, hydroxypropyl acrylate, hydroxypropyl methacrylate, in particular the addition products of propylene oxide on acrylic or methacrylic acid, and 2- or 4-hydroxybutyl acrylate or methacrylate.

The epoxy-functional polyacrylate resins preferably employed as co-reactants for the polyisocyanate-modified polycarboxylic acids according to the invention ordinarily have a glass transition temperature (Tg), determined by differential scanning calorimetry (DSC), within the range from 20° C. to 100° C., preferably from 30° C. to 90° C., and an average molecular weight (Mw), determined by gel-permeation chromatography using polystyrene as standard, from 1500 to 30,000, preferably 2000 to 20,000. The epoxy equivalent weight amounts to 365 to 2840, preferably 430 to 1420.

Also suitable in principle by way of epoxy-functional powder-lacquer binding agents are epoxy-functional polycondensation resins, such as, for example, the known conversion products of epichlorohydrin with polyhydric phenols and also novolaks based on phenol.

In the preparation of powder lacquers from the polyisocyanate-modified polycarboxylic acids according to the invention, concomitant use is optionally made of further auxiliary substances and additives, such as, for example, curing catalysts, pigments, fillers or flow-control agents.

In the case of the catalysts that are optionally to be used concomitantly for accelerating curing, as a rule it is a question of the customary compounds known from the literature that are suitable for accelerating the reaction between carboxyl and epoxide groups, for example tetraalkylammonium salts such as, for example, tetrabutylammonium chloride, bromide or iodide, tetraethylammonium chloride, bromide or iodide, trimethylbenzylammonium chloride, dodecyldimethyl(2-phenoxyethyl)ammonium iodide, trimethylbenzylammonium chloride, dodecyldimethyl(2-phenoxyethyl)ammonium bromide or diethyl(2-hydroxyethyl)methylammonium bromide, catalysts with imidazole structure, such as, for example, imidazole, 2-methylimidazole, 2-methyl-4-ethylimidazole, 2[(N-benzylanilino)methyl]-2-imidazoline phosphate or 2-benzyl-2-imidazoline hydrochloride, tertiary amines, such as, for example, N,N-dimethylcyclohexylamine, N,N-diethylcyclohexylamine, N-methylpiperidine, N-methylmorpholine, pentamethyl diethylenetriaamine, N,N'-dimethylpiperazine or 1,4-diazabicyclo[2,2,2]octane, or the catalysts already named above which are optionally to be used concomitantly in the preparation of the polyisocyanate-modified polycarboxylic acids according to the invention and which are known from polyurethane chemistry, as well as arbitrary mixtures of such catalysts.

These catalysts may optionally be added in quantities from 0.01 wt. % to 5.0 wt. %, preferably 0.05 wt. % to 2.0 wt. %, relative to the total quantity of organic binding agent, i.e. polyisocyanate-modified polycarboxylic acids in combination with the epoxy-functional powder-lacquer binding agents but excluding the further auxiliary substances and additives which are used optionally.

Further auxiliary substances and additives which may be optionally added in the course of production of the powder lacquers are, for example, the customary pigments and fillers, the flow-control agents, light stabilizers, UV-absorbers or colour stabilizers that are known from powder-lacquer technology and that have already been described above as auxiliary substances and additives optionally to be used concomitantly in the preparation of the polyisocyanate-modified polycarboxylic acids according to the invention.

With a view to producing a ready-to-use powder lacquer, the polyisocyanate-modified polycarboxylic acids according to the invention are added to the powder-lacquer binding agents described above, having groups that are reactive with carboxyl groups and optionally further auxiliary substances and additives, and are combined, for example in extruders or kneaders, as a rule at temperatures above the melting-range of the individual components, for example at temperatures from 70° C. to 130° C., preferably from 70° C. to 110° C., so as to form a homogeneous material. In this case the polyisocyanate-modified polycarboxylic acids according to the invention and the binding agents having groups that are reactive with carboxyl groups are combined with one another in quantities that correspond to an equivalent ratio of carboxyl groups to groups that are capable of reacting with carboxyl groups, in particular epoxide groups, from 1.5:1 to 0.7:1, preferably from 1.3:1 to 0.8:1, particularly preferably 1.1:1 to 0.9:1.

Production of the powder lacquers is preferably effected, as described above, in a solvent-free process in a melt. However, it is of course also possible to mix all the individual components of the powder-lacquer system with one another in dissolved form in suitable solvents or solvent mixtures.

Suitable solvents for this less preferred way of proceeding are, for example, the customary lacquer solvents already named above which are optionally to be used concomitantly in the preparation of the polyisocyanate-modified polycarboxylic acids according to the invention.

After homogenisation of the individual components has taken place, these solvents which are optionally used concomitantly are separated from the powder lacquer according to the invention with the aid of suitable methods, for example by precipitation and simple removal by suction, spray drying or melt extrusion in an evaporation screw.

Irrespective of the process chosen for the production of powder lacquer, the solid resulting after cooling of the extrusion melt or removal of the solvents used concomitantly is subsequently ground and freed, by sieving, of the granular portions above the desired grain size, for example above 0.1 mm.

The ready-to-spray powder lacquer produced in this way can be applied by customary powder-application processes, such as, for example, electrostatic powder spraying or whirl sintering, onto the substrates to be covered. In accordance with the invention, arbitrary heat-resistant substrates, such as, for example, those made of metals, plastics, wood or glass, can be coated. The powder-lacquer formulations prepared in accordance with the invention preferably serve for the production of coatings for automobile applications, in particular for the production of clear lacquers for automobiles.

Curing of the coatings is effected by heating to temperatures from 110° C. to 220° C., preferably 130° C. to 180° C., for example during a period from 10 minutes to 60 minutes, preferably 10 minutes to 30 minutes. Hard and elastic coatings are obtained that have good solvent resistance and resistance to chemicals and that have outstanding flow. As the following examples show, the use of the polyisocyanate-modified polycarboxylic acids according to the invention as crosslinker in powder lacquers based on glycidyl-functional powder-lacquer binding agents results in coatings that, in comparison with those which have been cured with the previously known polyisocyanate-modified crosslinkers pertaining to the prior art, have at least equally good chemical and mechanical resistances but are distinguished, moreover, by a distinctly superior gloss.

EXAMPLES

The following examples serve for further elucidation of the invention. All percentage figures are percentages by weight, unless otherwise stated.

Isocyanate-Functional Initial Components A)

A1) Polyester-modified polyisocyanate containing isocyanurate groups, based on HDI, prepared in a manner analogous to Example 5 of EP-A 336 205.

| | |
|---|---|
| NCO content: | 11.0% |
| monom. HDI: | 0.1% |
| functionality: | 3.9 |
| viscosity (acc. to DIN 53 018): | 6100 mPas (23° C.) |

A2) Low-monomer isocyanate-functional prepolymer, prepared by conversion of a mixture (approx. 13:87) of 2,4'- and 4,4'-diisocyanatodicyclohexyl-methane (10 mol) with 1,10-decanediol (1 mol) at 100° C. and subsequent removal of the unconverted monomeric diisocyanate by film distillation (180° C./0.3 mbar).

| | |
|---|---|
| NCO content: | 10.6% |
| monom. diisocyanatodicyclohexylmethane: | 0.3% |
| functionality: | 2.0 |
| melting-point: | 82-91° C. |

A3) Polyisocyanate containing isocyanurate groups, based on HDI, prepared in a manner analogous to Example 7 of EP-A 0 330 966.

| | |
|---|---|
| NCO content: | 23.0% |
| monom. HDI: | 0.1% |
| functionality: | 3.2 |
| viscosity (acc. to DIN 53 018): | 1200 mPas (23° C.) |

A4) 2,4'- and 4,4'-diisocyanatodicyclohexyl-methane, monomeric (approx. 13:87)

| | |
|---|---|
| NCO content: | 32.0% |
| functionality: | 2.0 |

A5) Solvent-free polyisocyanate containing isocyanurate and uretdione groups, based on HDI and IPDI, prepared in a manner analogous to EP-A 693 512 (polyisocyanate component 1).

| | |
|---|---|
| NCO content: | 20.2% |
| monom. HDI: | 0.1% |
| monom. IPDI: | 0.2% |
| functionality: | 2.7 |
| viscosity (acc. to DIN 53 018): | 2900 mPas (23° C.) |

A6) Monomer-containing isocyanate-functional prepolymer, prepared at 100° C. by conversion of a mixture (approx. 13:87) of 2,4'- and 4,4'-diisocyanatodicyclohexyl-methane (10 mol) with an ε-caprolactone polyester diol, initiated on 1,4-butanediol, having a molecular weight of 250 (3 mol).

| | |
|---|---|
| NCO content: | 17.4% |
| functionality: | 2.0 |
| melting-range: | 35-40° C. |

Example 1

800 g (10.96 g equiv.) adipic acid were charged in a ground-joint vessel under dry nitrogen and were melted down at a temperature of 155° C. With stirring, 200 g (0.52 g equiv.) of the isocyanate-functional component A1), corresponding to an equivalent ratio of carboxyl groups to isocyanate groups of 21.1:1, were now added over a period of 30 min, the formation of $CO_2$ having begun immediately after the start of addition of polyisocyanate. After conclusion of the evolution of gas the reaction mixture was stirred intensely for a further 5 min and was subsequently poured onto a metal sheet in order to cool. After cooling to room temperature, a polyisocyanate-modified polycarboxylic acid according to the invention was obtained having the following characteristic data:

| | |
|---|---|
| content of carboxyl groups: | 50.6% |
| equivalent weight: | 89 g/g equiv. COOH |
| carboxyl functionality (calc.): | 2.04 |
| content of amide groups (calc.): | 2.3% |
| melting-point: | 120-123° C. |

Examples 2 to 8

In accordance with the process described above, polyisocyanate-modified polycarboxylic acids were prepared using different dicarboxylic acids and the isocyanate-functional structural components A1)-A5). The following table shows the compositions and characteristic data of the products according to the invention.

Example 9

Comparison, Polyisocyanate-Modified Polyanhydride According to EP-B 0 695 771

1000 g dodecanedioic acid were heated for 2 hours under dry nitrogen together with 260 g acetic anhydride. Subsequently the acetic acid which had arisen was distilled off at 130° C. in a water-jet vacuum. To the melt of dodecanedioic polyanhydride now present there were added, within 45 min, 200 g (1.09 g equiv.) of polyisocyanate A3), and stirring was continued until, after about 2 hours, no more free isocyanate groups could be detected by IR spectroscopy. The melt was poured onto a metal sheet in order to cool, and a polyisocyanate-modified polyanhydride was obtained having the following characteristic data:

| | |
|---|---|
| content of carboxyl groups: | 10.2% |
| content of carboxylic anhydride: | 16.6% |
| equivalent weight: | 128 g/g equiv. COOH |
| content of amide groups: | 4.2% |
| melting-point: | 87-101° C. |

Example 10

Comparison, Polyisocyanate-Modified Polycarboxylic Acid According to EP-A 0 874 010

1000 g dodecanedioic acid were heated for 2 hours under dry nitrogen together with 260 g acetic anhydride. Subsequently the acetic acid which had arisen was distilled off at 130° C. in a waterjet vacuum. To the melt of dodecanedioic polyanhydride now present there were added, within 45 min, 368 g (2.02 g equiv.) of polyisocyanate A3), and stirring was continued until, after about 2 hours, no more free isocyanate groups could be detected by IR spectroscopy. Now there were added dropwise, within 15 minutes, 21 g water and, after a further 2 hours, 158 g of polyisocyanate A3). After conclusion of the evolution of gas the reaction melt was stirred for a further 30 min and was subsequently poured onto a metal sheet in order to cool. A polyisocyanate-modified polycarboxylic acid was obtained having the following characteristic data:

| | | Example | | | | | | |
|---|---|---|---|---|---|---|---|---|
| | | 2 | 3 | 4 | 5 | 6 | 7 | 8 |
| Dodecanedioic acid | [parts by weight] | 85 | — | — | — | — | — | — |
| Azelaic acid | [parts by weight] | — | — | 64 | 64 | 64 | 64 | 42 |
| Sebacic acid | [parts by weight] | — | 80 | 16 | 16 | 16 | 16 | 28 |
| Isocyanate A1) | [parts by weight] | — | — | 20 | — | — | — | — |
| Isocyanate A2) | [parts by weight] | 15 | — | — | — | — | — | — |
| Isocyanate A3) | [parts by weight] | — | 20 | — | — | — | — | — |
| Isocyanate A4) | [parts by weight] | — | — | — | 20 | — | — | — |
| Isocyanate A5) | [parts by weight] | — | — | — | — | 20 | — | 30 |
| Isocyanate A6) | [parts by weight] | — | — | — | — | — | 20 | — |
| Equivalent ratio | [COOH:NCO] | 19.4 | 7.2 | 16.0 | 5.5 | 8.7 | 10.1 | 5.0 |
| Content of carboxyl groups | [wt. %] | 32.6 | 33.3 | 36.0 | 28.7 | 35.4 | 36.6 | 28.5 |
| Equivalent weight | [g/g equiv. COOH] | 138 | 135 | 125 | 157 | 127 | 123 | 158 |
| Carboxyl functionality | | 2.00 | 2.19 | 2.07 | 2.00 | 2.07 | 2.00 | 2.14 |
| Content of amide groups | [wt. %] | 1.7 | 6.3 | 2.3 | 7.0 | 4.3 | 3.7 | 6.6 |
| Melting-point | [° C.] | 124-126 | 122-129 | 82-88 | 85-90 | 81-87 | 78-82 | 77-90 |

| | |
|---|---|
| content of carboxyl groups: | 10.0% |
| content of carboxylic anhydride: | 7.2% |
| equivalent weight: | 232 g/g equiv. COOH |
| content of amide groups: | 9.0% |
| melting-point: | 89–95° C. |

Example 11

Use 84.7 parts by weight of a commercial polyacrylate containing glycidyl groups (Almatex® PD 7610, Anderson Development Company, Adrian, Mich.) with an epoxide content of 7.8 wt. % (equivalent weight 551 g/g equiv. epoxide) were mixed thoroughly with 13.7 parts by weight of the polyisocyanate-modified polycarboxylic acid from Example 1, corresponding to an equivalent ratio of carboxyl to glycidyl groups of 1:1, 1.0 parts by weight of a commercial flow-control agent (Worlée® Add 101, Worlée-Chemie GmbH, Hamburg), 0.3 parts by weight tin(II) palmitate as catalyst and 0.3 parts by weight benzoin, and were subsequently homogenised with the aid of a twin-screw extruder manufactured by APV Baker Inc. (Grand Rapids, Mich.) of type MP 19 PC at 300 rpm and at a casing temperature of 100° C. to 110° C. in the process part. After cooling, the solidified melt was ground and sieved with the aid of a classifier mill ICM 4 (Neumann & Esser Deutschl and GmbH & Co. KG, Übach-Palenberg) with a 90 μm sieve.

The powder lacquer obtained in this way was sprayed with an ESB cup gun at a high voltage of 70 kV onto a degreased, grey-precoated steel sheet and was cured for 30 min at a temperature of 145° C. In the case of a layer thickness of about 70 μm, the following lacquer properties were found:

| | | |
|---|---|---|
| Gelling-time/160° C. | [s] | 131 |
| Flow (visual)[a)] | | + |
| Pendulum hardness[b)] | [s] | 175 |
| Gloss[c)] | 20° | 84.0 |
| | 60° | 92.1 |
| | 85° | 104.3 |

| | | | |
|---|---|---|---|
| Yellowing[d)] Δb | | | 0.29 |
| Acetone test[e)] | DS | | 50 |
| | verdict | | 0 |

[a)] assessment: ++ very good, + good, 0 moderate, − poor
[b)] pendulum hardness acc. to König (DIN 53157)
[c)] gloss = gloss acc. to Gardner; 20°, 60° and 85° angle of reflection
[d)] b-value of the undersurface: −4.27
[e)] DS = number of double strokes with impregnated cotton swab verdict:
0 = film intact
1 = film surface slightly softened
2 = film swollen down to undersurface
3 = film dissolved
m = matt (loss of gloss)

Examples 12 to 20

According to the Invention and Comparison

Clear powder lacquers were produced by the process described in Example 11, starting from the polyacrylate Almatex® PD 7610, which contains glycidyl groups and which is described in Example 11, and from the polyisocyanate-modified polycarboxylic acids from Examples 2 to 8. For comparison, powder lacquers that contained the polyisocyanate-modified crosslinkers of Comparative Examples 9 and 10 were produced in analogous manner.

The powder lacquers formulated ready for use were each sprayed with an ESB cup gun at a high voltage of 70 kV onto degreased, grey-precoated steel sheets and were cured for 30 min at 145° C. The following table shows the compositions (parts by weight) of the powder lacquers and also technical lacquer data pertaining to the coatings obtained therefrom (assessment as in Example 11).

All the coatings showed no adverse evidence in the acetone test (assessment 0, in the case of 50 double strokes), i.e. they were solvent-resistant. The remaining lacquer properties, which can be gathered from the following table, prove that the coatings that contained the polyisocyanate-modified polycarboxylic acids according to the invention have a superior gloss in comparison with those which were cured with the known polyisocyanate-modified crosslinkers pertaining to the prior art, with otherwise comparable properties.

| | Example | | | | | | | | |
|---|---|---|---|---|---|---|---|---|---|
| | 12 | 13 | 14 | 15 | 16 | 17 | 18 | 19 (comparison) | 20 (comparison) |
| Almatex ® PD 7610 | 78.7 | 79.0 | 80.2 | 76.6 | 80.0 | 80.4 | 76.5 | 79.9 | 69.2 |
| Crosslinker from Example 2 | 19.7 | — | — | — | — | — | — | — | — |
| Crosslinker from Example 3 | — | 19.4 | — | — | — | — | — | — | — |
| Crosslinker from Example 4 | — | — | 18.2 | — | — | — | — | — | — |
| Crosslinker from Example 5 | — | — | — | 21.8 | — | — | — | — | — |
| Crosslinker from Example 6 | — | — | — | — | 18.4 | — | — | — | — |
| Crosslinker from Example 7 | — | — | — | — | — | 18.0 | — | — | — |
| Crosslinker from Example 8 | — | — | — | — | — | — | 21.9 | — | — |
| Crosslinker from Comp. Example 9 | — | — | — | — | — | — | — | 18.5 | — |
| Crosslinker from Comp. Example 10 | — | — | — | — | — | — | — | — | 29.2 |
| Worlée ® Add 101 | 1.0 | 1.0 | 1.0 | 1.0 | 1.0 | 1.0 | 1.0 | 1.0 | 1.0 |
| Benzoin | 0.3 | 0.3 | 0.3 | 0.3 | 0.3 | 0.3 | 0.3 | 0.3 | 0.3 |
| Tin(II) palmitate | 0.3 | 0.3 | 0.3 | 0.3 | 0.3 | 0.3 | 0.3 | 0.3 | 0.3 |
| Gelling-time 160° C. [s] | 110 | 99 | 113 | 111 | 135 | 105 | 122 | 88 | 95 |

-continued

| | Example | | | | | | | | |
|---|---|---|---|---|---|---|---|---|---|
| | 12 | 13 | 14 | 15 | 16 | 17 | 18 | 19 (comparison) | 20 (comparison) |
| Layer thickness [μm] | 67-71 | 55-63 | 43-46 | 55-58 | 42-48 | 60-65 | 50-67 | 55-62 | 45-57 |
| Pendulum hardness[b)] [s] | 173 | 169 | 164 | 175 | 169 | 168 | 165 | 168 | 170 |
| Flow (visual)[a)] | + | ++ | ++ | ++ | ++ | ++ | ++ | ++ | + |
| Gloss[c)] | | | | | | | | | |
| 20° | 84.3 | 83.0 | 85.3 | 82.3 | 84.3 | 85.2 | 80.0 | 73.8 | 79.7 |
| 60° | 92.3 | 92.3 | 92.5 | 91.1 | 92.5 | 91.9 | 88.0 | 88.1 | 90.2 |
| 85° | 103.8 | 105.2 | 106.1 | 104.9 | 103.4 | 106.4 | 104.7 | 103.9 | 102.9 |
| Yellowing[d)] Δb | 0.31 | 0.29 | 0.31 | 0.37 | 0.30 | 0.35 | 0.31 | 0.29 | 0.30 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing polyisocyanate-modified polycarboxylic acids comprising reacting
    A) an anhydride-group-free polycarboxylic-acid component with
    B) an isocyanate-functional component having an (average) isocyanate functionality of at least 1.8
    at an equivalent ratio of carboxylic acid groups to isocyanate groups of from 2:1 to 50:1;
    wherein the polyisocyanate-modified polycarboxylic acids are solid below 40° C. and liquid above 130° C., and have
    a) an average carboxylic acid functionality of at least 1.8,
    b) a content of free carboxylic acid groups (determined as —COOH; molecular weight=45) of from 4.0 wt. % to 80.0 wt. % and
    c) a content of amide groups (determined as —CONH—; molecular weight=43) of from 0.4 wt. % to 32.5 wt. %.

2. The process according to claim 1, wherein saturated aliphatic and/or cycloaliphatic dicarboxylic acids having from 4 to 20 carbon atoms or mixtures thereof are employed as polycarboxylic acid component A).

3. The process according to claim 1, wherein saturated linear aliphatic dicarboxylic acids having from 5 to 12 carbon atoms or mixtures thereof are employed as polycarboxylic acid component A).

4. The process according to claim 1, wherein the isocyanate-functional component B) comprises compounds having exclusively aliphatically and/or cycloaliphatically bound isocyanate groups.

5. The process according to claim 1, wherein the isocyanate-functional component B) is selected from the group consisting of 1,6-hexamethylene diisocyanate, 1-isocyanato-3,5,5-trimethyl-5-isocyanatomethylcyclohexane, 4,4'-diisocyanatodicyclohexyl-methane, polyisocyanates thereof, NCO prepolymers thereof, and mixtures thereof.

6. The process according to claim 1 carried out in a solvent-free manner in a melt.

7. The process according to claim 1 carried out in solvents or in solvent mixtures.

8. The process according to claim 7, wherein the solvents are selected from the group consisting of ethyl acetate, butyl acetate, ethylene glycol monomethyl ether acetate, ethylene glycol monoethyl ether acetate, 1-methoxypropyl-2-acetate, 2-butanone, 4-methyl-2-pentanone, cyclohexanone, toluene, acetone, propylene glycol diacetate, diethylene glycol dimethyl ether, diethylene glycol ethyl ether acetate and diethylene glycol butyl ether acetate, N-methylpyrrolidone, N-methylcaprolactam, N,N-dimethylformamide, N,N-dimethylacetamide, methylene chloride, and mixtures thereof.

* * * * *